United States Patent [19]

Kurowski

[11] Patent Number: 5,296,140
[45] Date of Patent: Mar. 22, 1994

[54] CONTINUOUS FILTRATION DEVICE

[76] Inventor: Serge Kurowski, 5, rue des Mésanges, 4121 Neuvill-en-Condroz, Belgium

[21] Appl. No.: 962,783

[22] PCT Filed: May 15, 1992

[86] PCT No.: PCT/BE92/00018
§ 371 Date: Dec. 28, 1992
§ 102(e) Date: Dec. 28, 1992

[87] PCT Pub. No.: WO92/20426
PCT Pub. Date: Nov. 26, 1992

[30] Foreign Application Priority Data

May 15, 1991 [BE] Belgium ............ 09100450

[51] Int. Cl.⁵ ............................ B01D 33/327
[52] U.S. Cl. ............................ 210/328; 210/330; 210/333.1; 210/344; 210/345
[58] Field of Search .......... 210/328, 330, 333.1, 210/344, 345, 106–108, 232, 333.01, 347, 450, 479, 541

[56] References Cited

U.S. PATENT DOCUMENTS 3,830,658 8/1974 Davister.
4,172,791 10/1979 Davister.
4,330,404 5/1982 Davister.

FOREIGN PATENT DOCUMENTS 768591 7/1971 Belgium.
847088 10/1976 Belgium.

*Primary Examiner*—Robert A. Dawson
*Assistant Examiner*—W. L. Walker

[57] ABSTRACT

A continuous filtration device, comprising cells (1) arranged in a carousel around an axis of rotation and each presenting a horizontal axis of tilt, follower elements (9, 10), carried by a lever (7), at least one stationary guiding element (13, 14) for each of the follower elements, an additional lever (21, 22) fixedly connected to each cell, a mobile stop (23, 24) and an elastic element (29, 30) connecting the stop to a fixed support (25, 26) and acting on the stop in a first direction, the additional lever cooperating with the stop by acting on it in directions always approximately opposite to the aforesaid first direction.

10 Claims, 3 Drawing Sheets

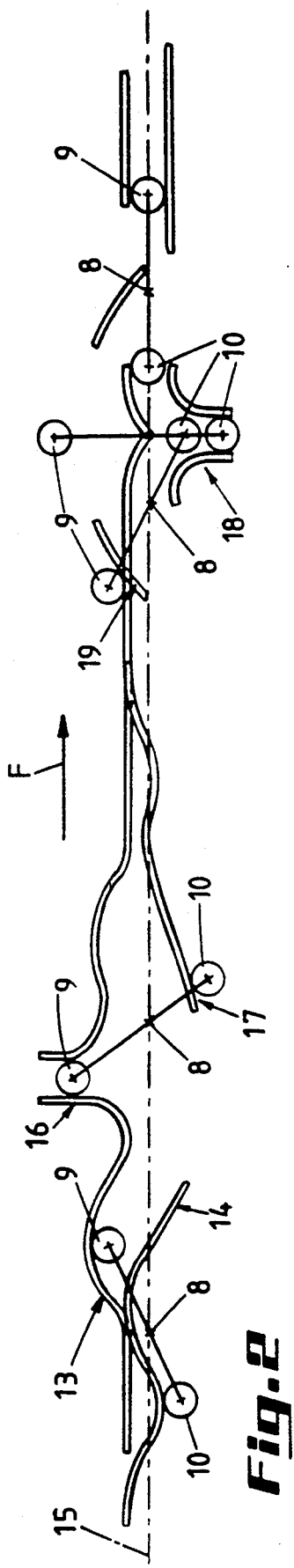
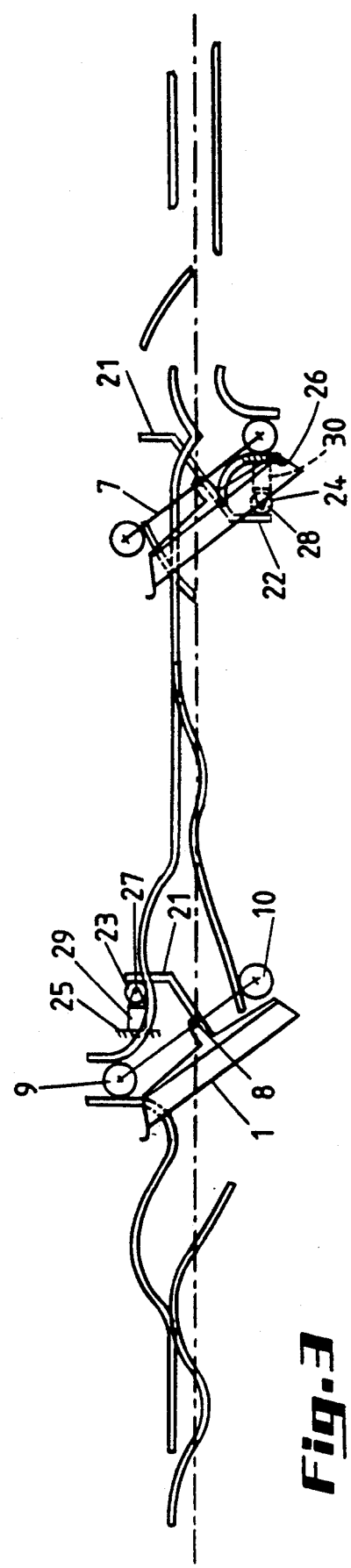

CONTINUOUS FILTRATION DEVICE

The present invention relates to a continuous filtration device, comprising:

barrel-shaped filter cells, each presenting an opening which is placed upwards during filtration and which is covered by a filtering layer, these cells being arranged in a carousel around a vertical axis of rotation and each presenting a horizontal axis of tilt which intersects the axis of rotation of the carousel, a lever connected in a fixed way to each filter cell so as to intersect their axis of tilt at a tilting point, follower elements, carried by the lever and placed on it, on either side of the tilting point, at least one stationary guiding element for each of the follower elements of the lever of a cell, these guiding elements being reciprocally arranged in a carousel area so as to achieve a tilting of each cell inside this area about is axis of tilt, at least one housing provided in the first of these guiding elements for the corresponding follower element, this housing being placed so as to allow a turning of the lever around the follower element in position in this housing, at least one loading area which is provided on a second guiding element and on which its corresponding follower element acts when the follower element corresponding to the first guiding element respectively leaves its housing or enters the latter, and means for rotationally driving (5,6) the filtering cells around the aforesaid axis of rotation (2).

This type of device is already long known, employed in filters, called Bird-Prayon, and put on the market by the firms Bird Machine, Prayon and Process Filtration and Liquid Equipment.

Such filters are used, among others, in industrial plants for the production of phosphoric acid. They permit a separation of solids from liquids, in an ideal way, by means of filtration under vacuum and washing the cake formed in the cells, then a tilting of the cells in order to unload the filtration cake.

During this tilting, the guide rails are, in specific locations, subjected to considerable stresses which can cause shocks and vibrations and lead to rapid wear and tear of the working parts. These stresses take place, in particular, when the back roll of the turning lever of a cell comes into contact with its guide rail, at the time of tilting the latter, or even when the front roll comes into contact with its guide rail, in order to permit the return of the cell to its horizontal position.

The risks of shocks, vibrations and premature wear and tear of the working parts have the effect of limiting the rotational speed of the filter. Thus, as the filtration capacity of a plant is proportional to the square root of the rotational speed of the filter, this is therefore limited too.

A continuous filtration device in a carousel, displaying a tilting stage of the barrels, guided along by means of guide rails with the help of a turning lever, fitted at its two ends with rolls, is described in U.S. Pat. No. 4721566. The rolls and guide rails are subjected to the described stresses here too.

Finally, a device of the same type is also known, which is described in U.S. Pat. No. 3389800. In this device, a tilt of the cells is provided towards the front in the direction of rotation of the carousel, that is to say towards the adjoining cell in the process of being cleaned. For a long time already, a tilting of cells towards the rear has been provided instead, that is to say towards the adjoining cell which still has to be cleaned. The short arm, V-shaped lever, as designed in this U.S. Pat. No. 3389800, while suitable for the tilting of small cells, is no longer suited to great weights and the cell sizes in current plants.

The aim of the present invention is to produce a continuous filtration device in which the disadvantages mentioned above are reduced or overcome. The means provided to solve the posed problem can be applied to known plants with an equipment cost that is as low as possible.

In order to solve these problems, a device has been designed, according to the invention, as described at the beginning, and moreover, comprising:

a first additional lever connected in a fixed way to each filter cell, on or near to their axis of tilt, a first mobile stop, and an elastic element connecting the first stop to a fixed support and acting on the first stop in a first direction, the first additional lever cooperating with the first stop by acting on it in directions always roughly opposite to the aforesaid first direction, while the follower element corresponding to the second guiding element acts on the aforesaid corresponding loading area. The balancing of the weight of the cell and the forces of inertia that it generates at the end of its tilting is thus no longer just carried out by the follower roll, for example the rear follower roll in the direction of rotation of the carousel, on its guide rail. The said first additional lever, when acting on a movable stop, with a spring-loaded return, contributes to this balancing and the force experienced by the guide rail is thus decreased.

In a device according to the invention, in which at least a housing is provided in the second guiding element for the corresponding follower element, this housing being placed so as to allow a turning of the lever around the follower element in position in this housing, at least a loading area being provided on this first guiding element, area on which its corresponding follower element acts when the follower element corresponding to the second guiding means respectively enters its housing or leaves it, it is possible to provide, that it, moreover, comprises:

a second additional lever connected in a fixed way to each filter cell, on or near to their axis of tilt, a second mobile stop, and an elastic element connecting the second stop to a fixed support and acting on the second stop in a second direction, the second additional lever cooperating with the second stop by acting on it in directions always roughly opposite to the aforesaid second direction, while the follower element corresponding to the first guiding element acts on the aforesaid corresponding loading area.

The balancing of the weight of the cell and the force of inertia that it generates at the beginning of the return of the cell from its tilted position towards its horizontal position is no longer just carried out here by the follower roll, for example the front follower roll, on its guide rail. The second additional lever contributes here too to this balancing and decreases the force experienced by the guide rail.

According to an advantageous embodiment of the invention, the first and second additional levers are arranged on both sides of the axis of tilt. Preferably, they are designed so as to together form a single component.

According to a preferred embodiment of the invention, the lever and the additional levers are, in a horizontal projection view, arranged more or less crosswise about the axis of tilt.

According to a particular embodiment of the invention, each stop consists of a cylindrical roll capable of turning about an axis parallel to the axis of tilt. According to the invention, each additional lever advantageously presents a curved bearing surface in order to cooperate with its stop roll, and the roll and the bearing surface are mutually arranged so that the additional lever pivots approximately about the point of tangency between the bearing surface and the roll during their cooperation. In this preferred embodiment, the action of the lever is fast punctual on the cylindrical surface area of the roll and the deviation from the direction of this action with respect to the direction of the action on the elastic element, throughout the period of contact between the stop roll and the additional lever, is going to be minimal.

According to another embodiment of the invention each spring component is prestressed.

Other details and distinctive features of the invention will emerge from the non-exhaustive description given below, and with reference to the appended drawings.

FIG. 1 schematically shows a continuous filtration device.

FIG. 2 shows the guidage of the cells during their tilting in a known device.

FIG. 3 shows the guidage of the cells during their tilting in a device according to the invention.

The identical or analogous parts bear the same references on the different drawings.

Figure 1:
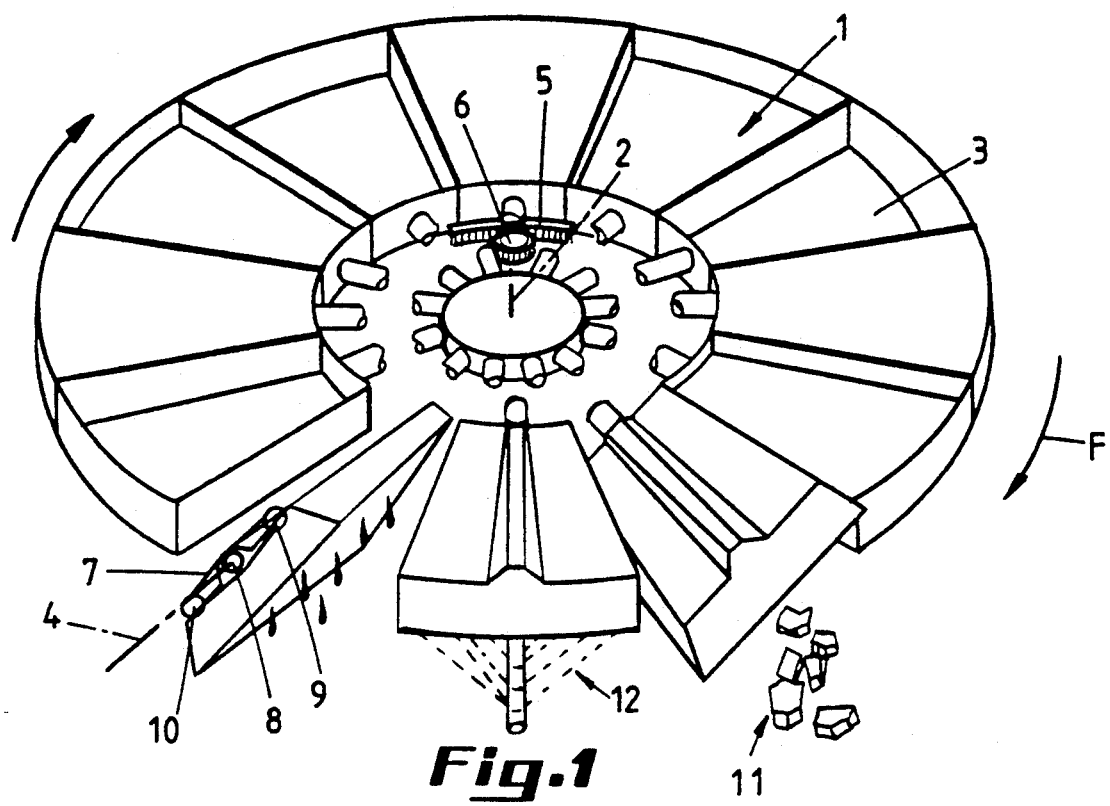

In FIG. 1, a standard, continuous filtration device is shown schematically as used, for example, in the filtration of phosphoric acid.

In the embodiment shown in FIG. 1, the barrel-shaped filter cells presenting an upward opening during filtering, are arranged in a carousel around a vertical axis of rotation 2. These cells 1 are covered by a horizontal filtering layer 3 below which the filtration liquid is collected. Each cell 1, each one of them, also presents a horizontal axis of tilt 4 which intersects the axis of rotation 2 of the carousel.

In the illustrated production example in FIG. 1, the rotation of the filter is carried out by a partially-shown gear rack 5, which is driven in rotation in the direction F around the axis 2 by means of a toothed wheel 6.

Each of the cells 1 is also provided with a turning lever 7, one of which has been depicted in FIG. 1. This lever is connected in a fixed way to the filter cell so as to intersect their axis of tilt at a tilting point 8. Each end of the turning lever is supplied with a follower element, in the illustrated case a front roll 9 and a back roll 10, when the direction of rotation F and the horizontal position of the filter cells are considered.

As emerges from FIG. 1, the three filter cells shown at the bottom on this drawing have stopped filtering and are being tilted backwards about their axis 4 in order to allow the unloading of the filtration cake 11 and a wash 12 of the filtering layer.

The operation of a device of this type is described in detail, among others, in the aforesaid U.S. patents, but also, for example, in patent Nos. BE-A-768591 and BE-A-847088.

The tilting of the filter cells is achieved by means of a guidage of the follower rolls 9 and 10 inside the stationary guiding elements, placed, for example, on the outside of the carousel, where the turning lever 7 of the cells goes. For example, it is possible to provide for the device illustrated in FIG. 1, in front of the three cells in the tilting position, two guiding elements 13 and 14, as depicted in FIG. 2.

As emerges from this last figure, the guiding elements 13 and 14 are each made up of several curved sections of guide rail that follow the front rolls 9 and back rolls 10 respectively. In the course of its progression, following the direction of arrow F, the horizontal axis of tilt 4 of the cell and thus of the lever 7, which intersects this axis at the tilting point 8, follows a horizontal path designated by reference 15 and shown on a combined line drawings.

During its progression, the front follower roll meets a housing 16 between two vertically arranged sections of the rail 13. Once the front roll 9 has entered the housing, the cell and the back roll 10 can be tipped up in an anticlockwise direction in FIG. 2. At the end of the tilting, the back roll 10 is received in 17 on a section of the guide rail 14. A considerable stress appears between this roll and this section of rail during the exit of the front roll 9 out of its housing 16.

Further to the right on FIG. 2, the back follower roll 10 has to enter a housing 18 provided between two vertically arranged sections of the rail 14. During this penetration, the front roll 9 is supported at 19 on a section of the guide rail 13, where a considerable stress appears between this roll and this section of rail.

Once the back roll 10 has entered its housing, a tilting of the cell and of the front roll occurs so as to return the filter cell to its initial position.

Figure 4A:
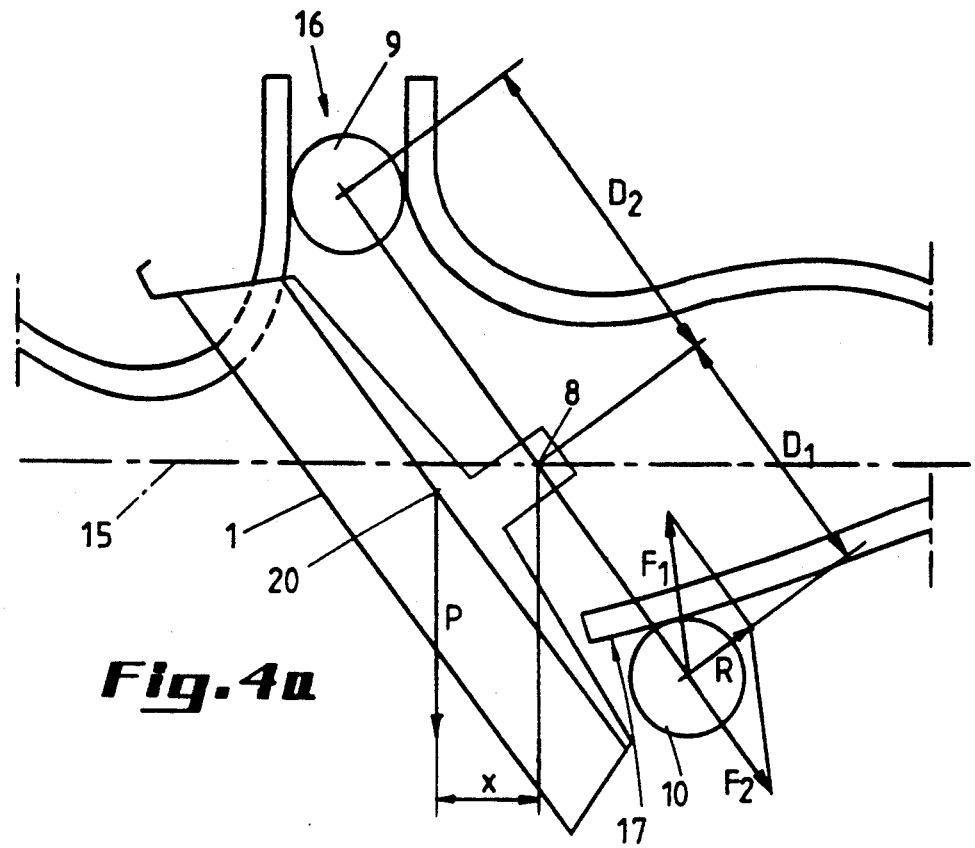
FIGS. 4a and 4b show, on an enlarged scale, the description of the forces at the spot of a high loading of the guide rails in the device according to FIGS. 2 and 3 respectively.

FIG. 4a shows, on a larger scale, the location 17 of the rail 14 and the housing 16 of the rail 13, at the time of the most pronounced loading of the rail 14. Cell 1 is schematically shown at this spot. Apart from the aforesaid tilting point 8 of the cell 1, the centre of gravity 20 thereof should be noted. At location 17, the follower roll 10 has to counterbalance the force transmitted by the weight and the force of inertia of the cell due to the tilt and the engagement of rail 14, and that according to the following equation (1)

$$P.x = R.D_1 \qquad (1)$$

wherein

P = weight of the cell + the force of inertia, x = the vertically-projected distance of the distance between the tilting point 8 and the centre of gravity 20 of the cell, R3' the action of the follower roll 10 at location 17 of the rail 14 (R is the resultant of $F_1$, that is to say the perpendicular force at the rail, and of $F_2$, the force in the axis of the turning lever 7), $D_1$ = the distance between the centre of the back follower roll 10 and the tilting point 8 of the cell 1.

In FIG. 4a, reference $D_2$ shows the distance between the centre of the front follower roll 9 and the tilting point 8 of cell 1.

It should be noted that on top of the fact that action R of roll 10 on the rail 14 is significant at location 17, it is unfavourably directed with respect to the slope of the rail 14 at this location.

By way of example, an embodiment of a device according to the invention, running inside existing guide rails, like those shown in FIG. 2, has been schematically shown in FIG. 3.

The illustrated device according to the invention moreover comprises an additional lever 21 connected in a fixed way to each filter cell 1, on or near to the axis of tilt 4. A second additional lever 22 may also be provided, it also being connected in a fixed way to each filtering cell (see the right-hand part of FIG. 3). In the latter case, the first and second additional levers 21 and 22 can be arranged on both sides with respect to the axis of tilt 4, for example when forming a single component, of which they are the two lever arms.

In the embodiment illustrated on the right-hand side of FIG. 3, lever 7 and the additional levers 21 and 22 are arranged, in a horizontal projection view, crosswise about the axis of tilt.

In this example, the additional levers 21 and 22 have a slightly bent shape. At the time when a follower roll 9 or 10 respectively violently stresses one of the guide rails 13 or 14, one of the additional levers 21 and 22 comes into contact with a mobile stop 23 or 24.

In the example illustrated in FIG. 3, this stop is made in the form of a stop roll capable of turning freely about its axis 27 or 28 and connected to a fixed support 25 or 26, shown only schematically, by means of an elastic element. The pivotal axes 27 or 28 of the stop rolls are parallel to the axis of tilt 4 of the cells when the stop rolls act.

According to the illustrated example, the elastic element connecting the stop roll to its fixed support is a compression spring 29 or 30 which acts on the stop roll so as to push it away from its fixed support and which thus allows a displacement of the stop roll towards its support, when it is loaded.

The additional lever 21 or 22 and the corresponding stop 23 or 24 are arranged with respect to one another so that, at the time of their contact, the additional lever acts in an opposite, or almost opposite, direction to the direction of the action f of the spring 29 or 30.

Figure 4B:
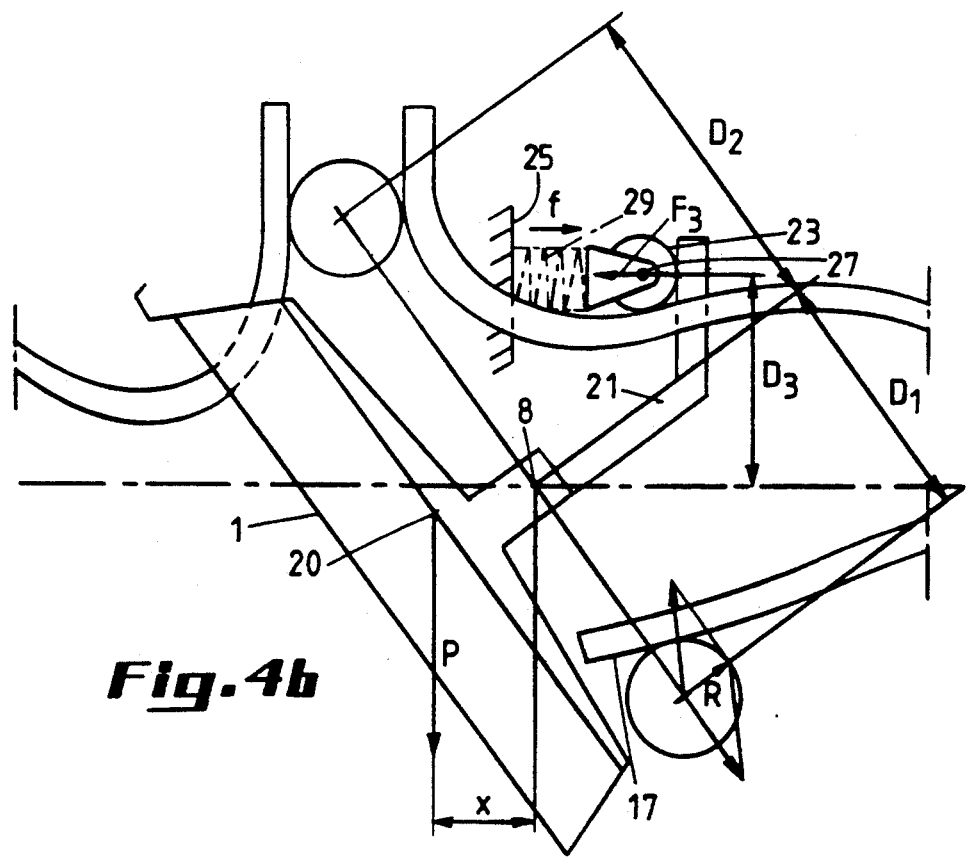

In FIG. 4b, location 17 of the rail 14 of the device according to the invention is shown in a similar way to FIG. 4a.

The balancing of the forces here corresponds to the following equation (2):

$$P.x = RD_1 + F_3 D_3 \qquad (2)$$

P, x, R and $D_1$ have the same meaning as that given previously.

$F_3$ = the action of the stop roll 23, on the compression spring 29, from its pivotal axis 27, when the additional lever 21 leans on it.

$D_3$ = the horizontally projected distance of the distance between the tilting point 8 of the cell 1 and the direction of force $F_3$ acting perpendicularly on lever 21 at its point of contact with the stop roll 23.

Since the values of P, x and $D_1$ do not vary, it clearly emerges that the value of R has been notably reduced in equation (2) in comparison with the previous equation (1). It follows that the guide rail 14 experiences a more little stress, at its point 17, and that the risks of shocks and vibrations, in particular, at the time of turning the cells around are significantly lessened. That allows the rotational speed of the filter to be increased, and therefore the filtration capacity of the latter.

What has just been described for lever 21 and the stop roll 23, applies equally to lever 22 and stop roll 24.

Figure 5:
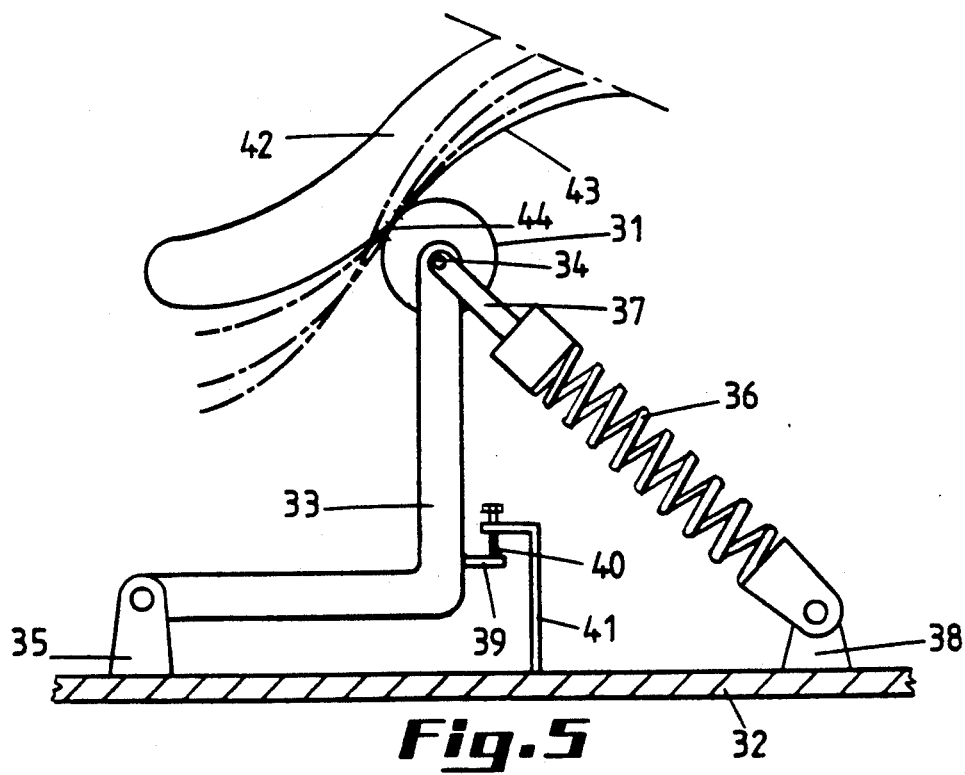
FIG. 5 shows an embodiment of the stop and the additional lever.

An example of the mobile stop to be provided in a device according to the invention is shown, in a more detailed way, in FIG. 5.

Here, the stop roll 31 is connected to the fixed support 32 through the intermediary of an angled part 33. The roller 31 is arranged so as to be able to pivot about its axis 34 at the end of the angled part 33, which at its other end is supported, in a hinged fashion, in a bearing block 35, fixed to the support.

The compression spring 36 is linked, at one end, to the axis 34, by means of a rocker arm 37 capable of freely turning about this axis. The spring, at its other end, is linked, in a hinged fashion, to a bearing block 38, supported at a fixed point to the support 32.

Finally, the angled lever 33 is fitted with a small, fixed plate 39, that juts out. An adjusting screw 40, screwed into a threaded hole of an angle bracket 41, fastened to the fixed support 32, acts on the small plate 39 so as to initially compress the spring 36. This can therefore be prestressed, which allows the force of the action of the stop roll to be adjusted, when it comes into contact with an additional lever, and to ensure perfect tilting and righting of each cell.

In the example illustrated in FIG. 5, the additional lever 42 presents a curved bearing surface 43 in order to cooperate with the stop roll 31.

During the passage of the follower roll, as illustrated, over a loading area provided on the guide rail, the bearing surface 43 and with it the lever 42 pivot roughly about the same tangential point, which is situated, on the follower roll 31, on the opposite side of the compression spring 36.

A highly favourable orientation of forces is thus obtained throughout the action of the stop on the additional lever.

It should be understood that the present invention is in no way limited to the embodiments described above and that changes can indeed be introduced to it without going beyond its scope.

Stops may be provided which are not in the form of a rotating roller, fixed guide cams for instance.

Elastic elements other than compression springs can also be devised, and, among others, drawbar springs, pneumatic or hydraulic shock absorbers, etc.

One can also imagine that the turning lever and the two additional levers form a single component.

I claim:

1. A continuous filtration device comprising:
   barrel-shaped filter cells, each presenting an opening which is placed upwards during filtration and which is covered by a filtering layer, these cells being arranged in a carousel around a vertical axis of rotation and each presenting a horizontal axis of tilt which intersects the axis of rotation of the carousel,
   a lever connected in a fixed way to each filter cell, so as to intersect their axis of tilt at a tilting point,
   follower elements, carried by the lever and placed on it on either side of the tilting point,
   at least one stationary guiding element for each of the follower elements of the lever of a cell, these guiding elements being reciprocally arranged in a carousel area so as to achieve a tilting of each cell inside this area about its axis of tilt, at least one housing provided in the first of these guiding elements for the corresponding follower element, this housing being placed so as to allow a turning of the lever around the follower element in position in this housing, at least one loading area which is provided on a second guiding element and on which its corresponding follower element acts when the follower element corresponding to the first guiding element respectively leaves its housing or enters the latter, and means for rotationally driving the filter cells around the aforesaid axis of rotation, a first additional lever connected in a fixed way to each filter cell, on or near to their axis of tilt, a first mobile stop, and an elastic element connecting the first stop to a fixed support and acting on the first stop in a first direction, said first additional lever cooperating with the first stop by acting on it in directions always approximately opposite to the aforesaid first direction, while the follower element corresponding to the second guiding element acts on the aforesaid corresponding loading area.

2. A device according to claim 1, comprising:

at least one housing provided in the second guiding element for the corresponding follower element, this housing being placed so as to allow a turning of the lever around the follower element in position in this housing, at least one loading area which is provided on the first guiding element, and on which its corresponding follower element acts when the follower element corresponding to the second guiding element respectively enters its housing or leaves it, a second additional lever connected in a fixed way to each filter cell, on or near to their axis of tilt, a second mobile stop, and an elastic element connecting the second stop to a fixed support and acting on the second stop in a second direction, said second additional lever cooperating with the second stop by acting on it in directions always approximately opposite to the aforesaid second direction, while the follower element corresponding to the first guiding element acts on the aforesaid corresponding loading area.

3. A device, according to claim 2, wherein the first and second additional levers are arranged on both sides with respect to the axis of tilt.

4. A device, according to claim 2, wherein the first and second additional levers are made so as to together form a single component.

5. A device, according to claim 2, wherein the lever is comprised of a drive rod which extends more or less straight between its two follower elements.

6. A device, according to claim 4, wherein the lever and the additional levers are arranged, in a horizontal projection view, more or less crosswise about the axis of tilt.

7. A device, according to claim 5, wherein the lever and the additional levers are made so as to together form a single component.

8. A device, according to claim 2, wherein each stop consists of a cylindrical roll capable of turning about an axis parallel to the axis of tilt.

9. A device, according to claim 8, wherein each additional lever presents a curved bearing surface in order to cooperate with its stop roll and in that the roll and the bearing surface are mutually arranged so that the additional lever pivots approximately about the point of tangency between the bearing surface and the roll during their cooperation.

10. A device, according to claim 2, wherein each elastic element can be prestressed.

* * * * *